US008344670B2

(12) United States Patent
Gassner

(10) Patent No.: US 8,344,670 B2

(45) Date of Patent: Jan. 1, 2013

(54) COUPLING FOR A MOVABLE FURNITURE PART

(75) Inventor: Simon Gassner, Dornbirn (AT)

(73) Assignee: Julius Blum GmbH, Hochst (AT)

( * ) Notice: Subject to any disclaimer, the term of this patent is extended or adjusted under 35 U.S.C. 154(b) by 256 days.

(21) Appl. No.: 12/582,976

(22) Filed: Oct. 21, 2009

(65) Prior Publication Data

US 2010/0038467 A1 Feb. 18, 2010

Related U.S. Application Data

(63) Continuation of application No. PCT/AT2008/000063, filed on Feb. 27, 2008.

(30) Foreign Application Priority Data

Apr. 23, 2007 (AT) ...................................... 627/2007

(51) Int. Cl.
*H02P 1/00* (2006.01)

(52) U.S. Cl. ..................... 318/255; 242/390; 242/390.8; 312/294; 312/391.1; 312/391.5

(58) Field of Classification Search .................. 240/390, 240/390.8; 318/255; 312/294, 391.1, 391.5; 242/390, 390.8

See application file for complete search history.

(56) References Cited

U.S. PATENT DOCUMENTS

| | | | | |
|---|---|---|---|---|
| 4,828,344 | A * | 5/1989 | Omata | 312/319.1 |
| 5,564,807 | A * | 10/1996 | Rock et al. | 312/331 |
| 7,651,179 | B2 * | 1/2010 | Chirumbolo | 312/319.1 |
| 7,780,251 | B2 * | 8/2010 | Dubach et al. | 312/319.7 |
| 2004/0100169 | A1 * | 5/2004 | Huber et al. | 312/319.5 |
| 2006/0214547 | A1 * | 9/2006 | Bonner et al. | 312/319.5 |
| 2008/0115417 | A1 * | 5/2008 | Huber | 49/349 |

FOREIGN PATENT DOCUMENTS

| | | |
|---|---|---|
| AT | 502 204 | 2/2007 |
| DE | 102 53 362 | 5/2004 |
| DE | 20 2006 008 825 | 1/2007 |
| EP | 0 635 226 | 1/1995 |
| EP | 0 664 984 | 8/1995 |
| WO | 2007/009133 | 1/2007 |
| WO | 2007/009135 | 1/2007 |

OTHER PUBLICATIONS

International Search Report issued Jun. 3, 2008 in International (PCT) Application No. PCT/AT2008/000063.

Austrian Search Report issued Oct. 19, 2007 in Austrian patent application No. A 627/2007.

* cited by examiner

*Primary Examiner* — Kawing Chan

(74) *Attorney, Agent, or Firm* — Wenderoth, Lind & Ponack, L.L.P.

(57) ABSTRACT

The invention relates to a retraction device for a movable piece of furniture, having a pulling means windable on a roll, and an electric motor is provided for driving the roll. The retraction device also has a coupling for releasably connecting the movable piece of furniture to the electric drive, and the coupling has a first coupling part for fastening to the movable piece of furniture and a second coupling part connected to the pulling means. The first coupling part has an opening for at least the partial acceptance of the second coupling part. A locking mechanism is provided by which the first coupling part can be connected to the second coupling part in at least two different positions, and the second coupling part is located at different depths in the opening in the two different positions.

14 Claims, 8 Drawing Sheets

COUPLING FOR A MOVABLE FURNITURE PART

This application is a Continuation of International application No. PCT/AT2008/000063, filed Feb. 27, 2008, the entire disclosure incorporated herein by reference.

BACKGROUND OF THE INVENTION

The present invention concerns a coupling for releasably connecting a movable furniture part to a drive, comprising a first coupling portion for fastening to the movable furniture part and a second coupling portion for fastening to the drive. The first coupling portion has an opening for at least partially receiving the second coupling portion.

Couplings of that kind suffer from the problem that, by virtue of installation tolerances in respect of the drive or the movable furniture part in the body or carcass of the piece of furniture, it is not always possible to predict how far the second coupling portion can be introduced into the opening in the first coupling portion. Thus, for example, the drive or the movable furniture part (and therewith the corresponding coupling portions) can be disposed at differing depths in the furniture body or carcass, depending on the respective installation situation.

The object of the invention is to develop a coupling of the general kind set forth, such that it involves compensation at least in respect of the depth tolerance in relation to the arrangement of the first and second coupling portions.

That object is obtained by a coupling having the feature of the present invention.

The provision of a locking mechanism which ensures locking of the two coupling portions relative to each other for different depths of insertion of the second coupling portion into the first coupling portion achieves the depth tolerance compensation required in accordance with the statement of object.

In a preferred embodiment of the coupling, it is provided that the locking mechanism releases the connection between the first and second coupling portions upon the attainment of a predetermined separation force. In that case, it is desirable if the predetermined separation force is of equal magnitude for the at least two different positions. That provides that use of the coupling does not involve any noticeable dependencies on the actual installation position.

The locking mechanism can have, for example, two clamping jaws which are biased relative to each other by a force storage means (for example springs) and which clamp the second coupling portion fast in the locking condition. If the separation force acting on the two coupling portions exceeds the force exerted on the clamping jaws by the force storage means, the locking mechanism is opened. That leads to uncoupling of the drive and the movable furniture part.

To facilitate insertion of the second coupling portion into the opening in the first coupling portion, a pin for insertion into the opening can be arranged on the second coupling portion. In that case, the pin can have at least two axially mutually spaced latching positions for the clamping jaws.

The two mutually spaced latching positions allow locking of the two coupling portions in the two different positions of the first and second coupling portions relative to each other.

In that case, each of the latching positions can have at least one groove, into which the clamping jaws engage in the locking condition.

There can also be two or more grooves per latching position so that the clamping jaws engage into two or more grooves in each latching position.

If the separation force for the at least two different positions of the coupling portions is to be of the same magnitude, it must however be guaranteed that the number of grooves into which the clamping jaws engage in the locking condition is the same for each of the latching positions.

It can be provided that the latching positions are markedly spaced from each other over the axial extent of the pin. Therefore, there is a non-grooved axial region of the pin between the grooves of the respective latching positions. It will be noted, however, that this is disadvantageous insofar as that only affords a stepwise compensating option for depthwise positioning of the two coupling portions relative to each other.

It is therefore particularly preferably provided that the pin has a plurality of adjacent grooves over its axial extent. In this case, therefore, there are non-grooved intermediate spaces between the individual latching positions. If it is provided that the clamping jaws respectively engage into a groove in the locking condition, a dedicated latching position is implemented by each groove. That affords an approximately stepless compensating option, in relation to the depthwise tolerance.

In order to permit the pin to be captured in a direction at a right angle to the direction of insertion (that is to say in the case of an eccentric approach), a funnel can be arranged in front of the opening of the first coupling portion.

The coupling according to the invention is suitable for a wide range of different drives. It will be noted, however, that it is particularly preferable that the second coupling portion is connectable to the pulling means (pulling member) of a retraction device.

The present invention further concerns a retraction device for a movable furniture part having a pulling means which can be wound on a roller, and there is provided an electric motor for driving the roller. The retraction device is distinguished by a second coupling portion, connected to the pulling means, of a coupling in accordance with one of the aforementioned embodiments.

Such a refraction device can be provided with a housing, in which the roller and the electric motor are arranged. In that case, it is advantageous if the housing has in the unwinding region of the roller a window which is substantially larger than the cross-section of the pulling means. As a result, the pulling means can relatively freely move in the unwinding region in a direction in an orthogonal relationship to the unwinding direction (and thus in an orthogonal relationship to the direction of movement of the movable furniture part), which provides for compensation in relation to installation tolerances at a right angle to the unwinding direction.

For example the diameter of the pulling means can be between about 0.5 mm and 1 mm, while the window is of a length and a width of about 5 mm.

If the retraction device is to have a touch-latch functionality (in that case the roller is releasable by an externally applied force acting on the movable furniture part) or if the intention is to ensure that, when a coupling is in an unlocked condition, the pulling means is wound on to the roller, the roller can be biased in the winding direction by a force storage means.

The force storage means serves on the one hand to wind on the pulling means when the coupling is unlocked. On the other hand, the force storage means provides for mechanical tension along the pulling means. By virtue of that arrangement, forces exerted on the movable furniture part by a user can be transmitted to the roller by way of the pulling means. A pulling or pushing force applied to the movable furniture part thereby results in a certain rotary movement of the roller, which can be detected by a suitable sensor (for example a rotary potentiometer). The sensor then triggers the electric motor of the retraction device (touch-latch functionality).

BRIEF DESCRIPTION OF THE DRAWINGS

Further advantages and details of the invention will be apparent from the Figures and the related specific description. In the Figures.

DETAILED DESCRIPTION OF THE INVENTION

Figure 1C:
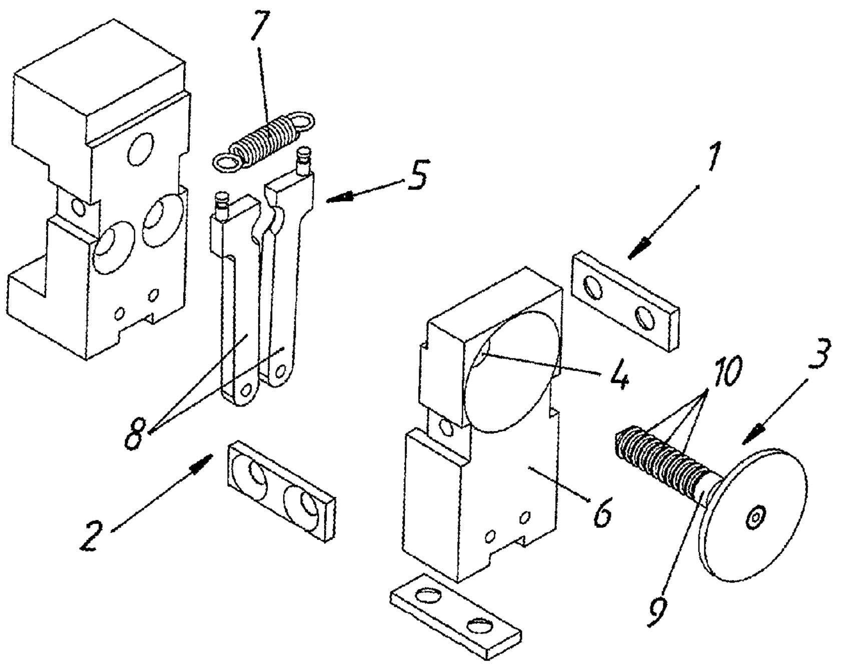
FIGS. 1*a* through 1*c* show two perspective views and exploded views respectively of an embodiment of a coupling according to the invention.
Figure 1A:
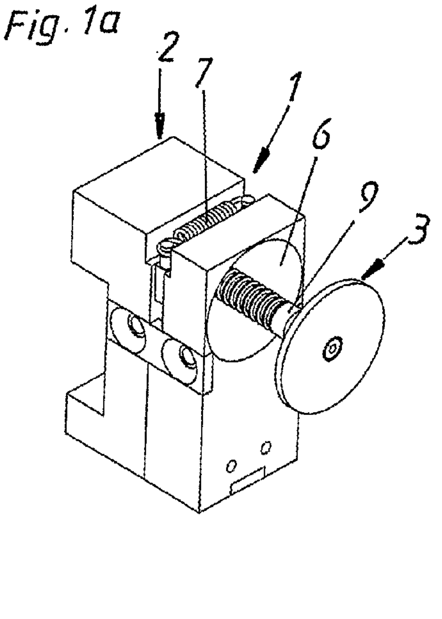
Figure 1B:
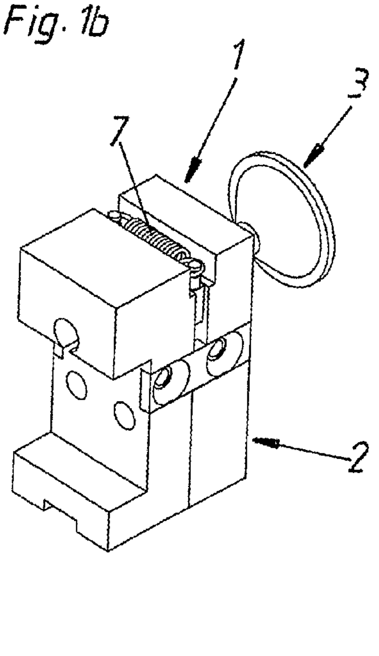

FIGS. 1*a* and 1*b* show two different perspective views of a coupling 1 according to the invention. The coupling 1 has a first coupling portion 2 which can be mounted to a movable furniture part (not shown in FIG. 1). There is also a second coupling portion 3 which in this embodiment has a pin 9 provided with grooves 10 (in FIG. 1*c*, only the foremost three grooves are denoted by reference 10, for the sake of enhanced clarity).

It can be seen that the first coupling portion 2 has an opening 4 into which the pin 9 of the second coupling portion 3 can be inserted to different depths (for example between 2 mm and 6 mm). Disposed in front of the opening 4 is a funnel 6 for capturing the pin 9 (see in particular FIGS. 7*a* through 7*c*).

In this embodiment, the first coupling portion 2 is of a substantially two-part configuration, with the locking mechanism 5 being arranged between the two parts. The locking mechanism 5 has two pivotably mounted clamping jaws 8 biased in the locking direction by a first (locking) force storage means 7.

As can be seen in particular from FIGS. 2*a* through 2*d* which show an insertion process (FIGS. 2*a* through 2*c*) and an unlocking process (FIG. 2*d*), respectively, the two clamping jaws are urged apart against the force of the first force storage means 7 during the insertion of the pin 9. That involves slight stretching of the first force storage means 7.

Figure 2A:
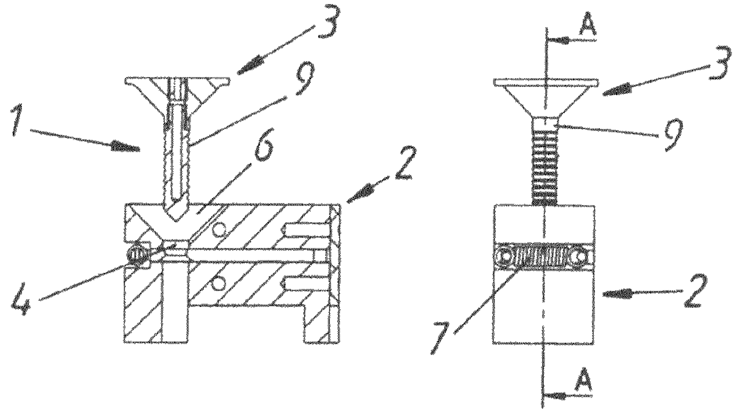
FIGS. 2*a* through 2*d* show a plan view and a respective associated view in section of a coupling according to the invention in various operating positions.
Figure 2B:
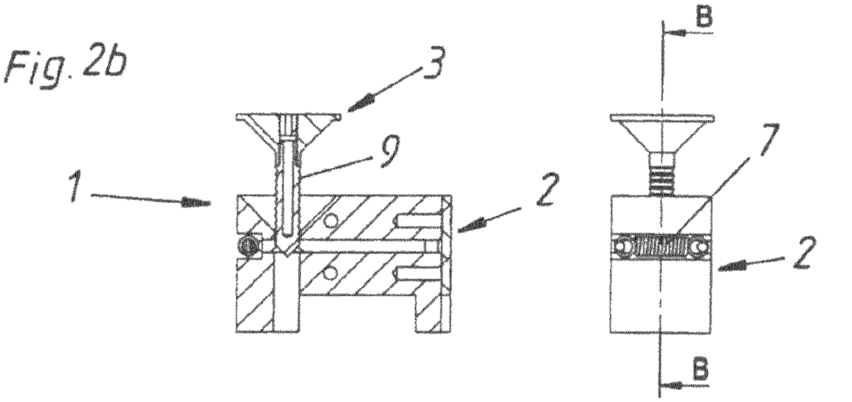
Figure 2C:
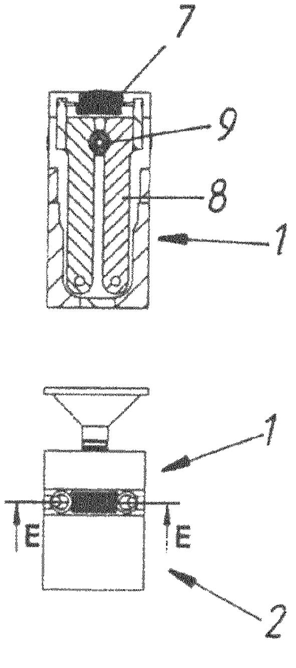

In FIG. 2*c*, the coupling 1 is in the locking condition and the first force storage means 7 is pressing the clamping jaws 8 against a single groove 10 on the pin 9.

Figure 2D:
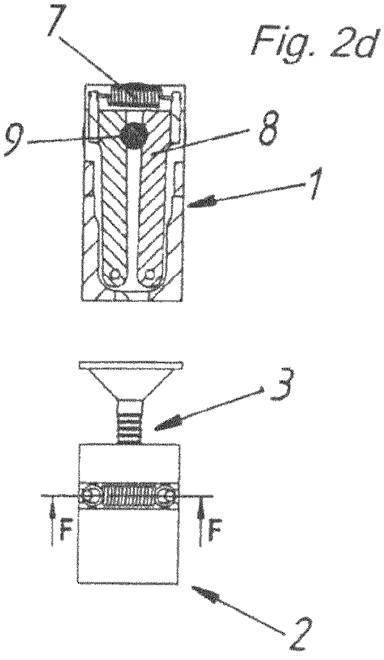

It can be seen in particular from the sectional view in FIG. 2*d* that, when the force exerted by the first force storage means 7 is exceeded, the clamping jaws 8 are urged apart by the pin 9, whereby the first force storage means 7 is slightly stretched. That means that the second coupling portion 3 can be removed from the first coupling portion 2.

It is essential that, in this embodiment, the pin 9 can be steplessly inserted into the opening 4 to differing extents, due to the plurality of grooves 10. The clamping jaws 8 can lock the pin 9 in any position as the pin 9 is provided with grooves 10 uninterruptedly substantially over its entire axial length.

Figure 3:
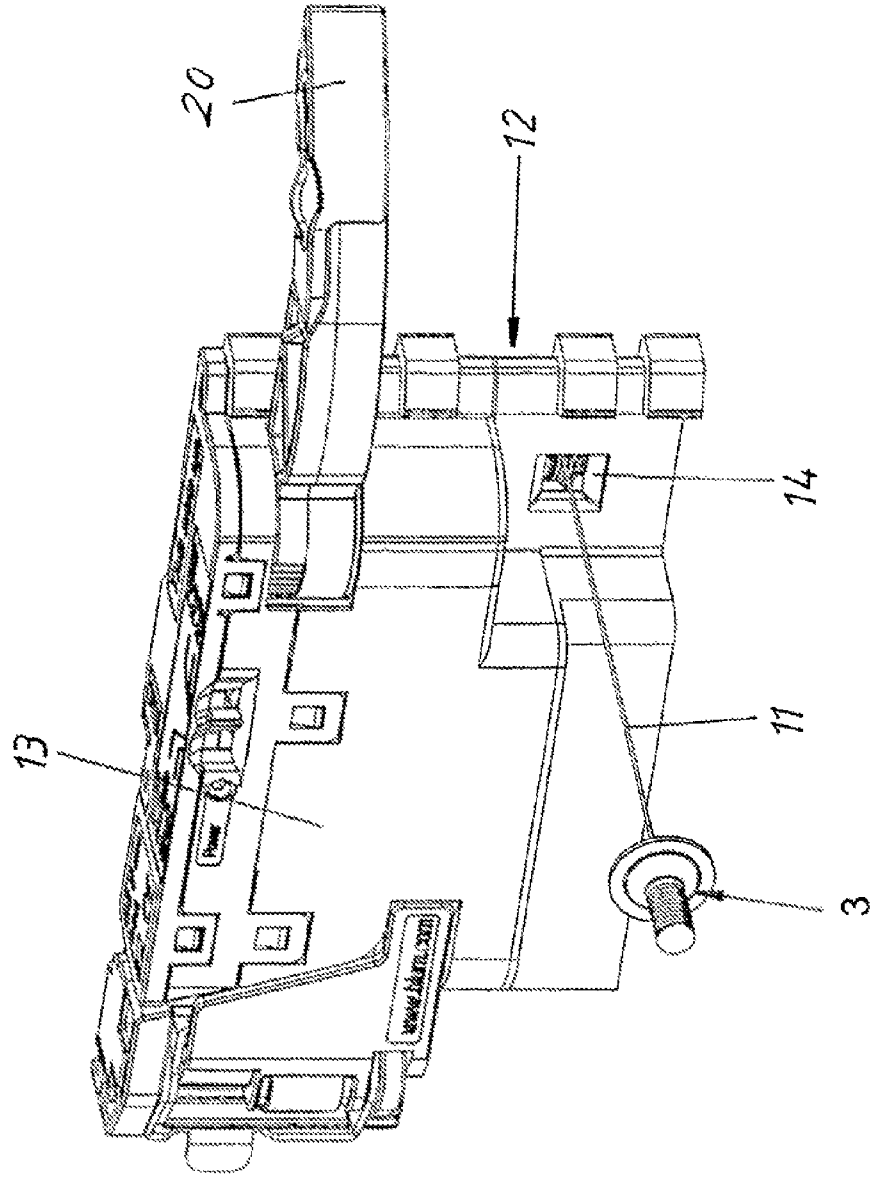
FIG. 3 shows a perspective view of a retraction device with the coupling according to the invention.

FIG. 3 shows a retraction device for a movable furniture part (not shown). The retraction device is provided in a drive 12 which, besides the retraction device, also has an ejection device with an ejection lever 20. The retraction device is disposed in a housing 13 from which the pulling means 11 is extended. The pulling means 11 has a first end connected to the second coupling portion 3 of the coupling 1 shown in the previous Figures.

The housing 13 has a window 14 which is substantially larger than the cross-section of the pulling means 11. That permits compensation for installation tolerances in directions in orthogonal relationship to the illustrated direction (longitudinal axis) of the pulling means 11. Depthwise compensation is ensured by the above-described mechanism so that, overall, this affords compensation in all directions in space.

Figure 4:
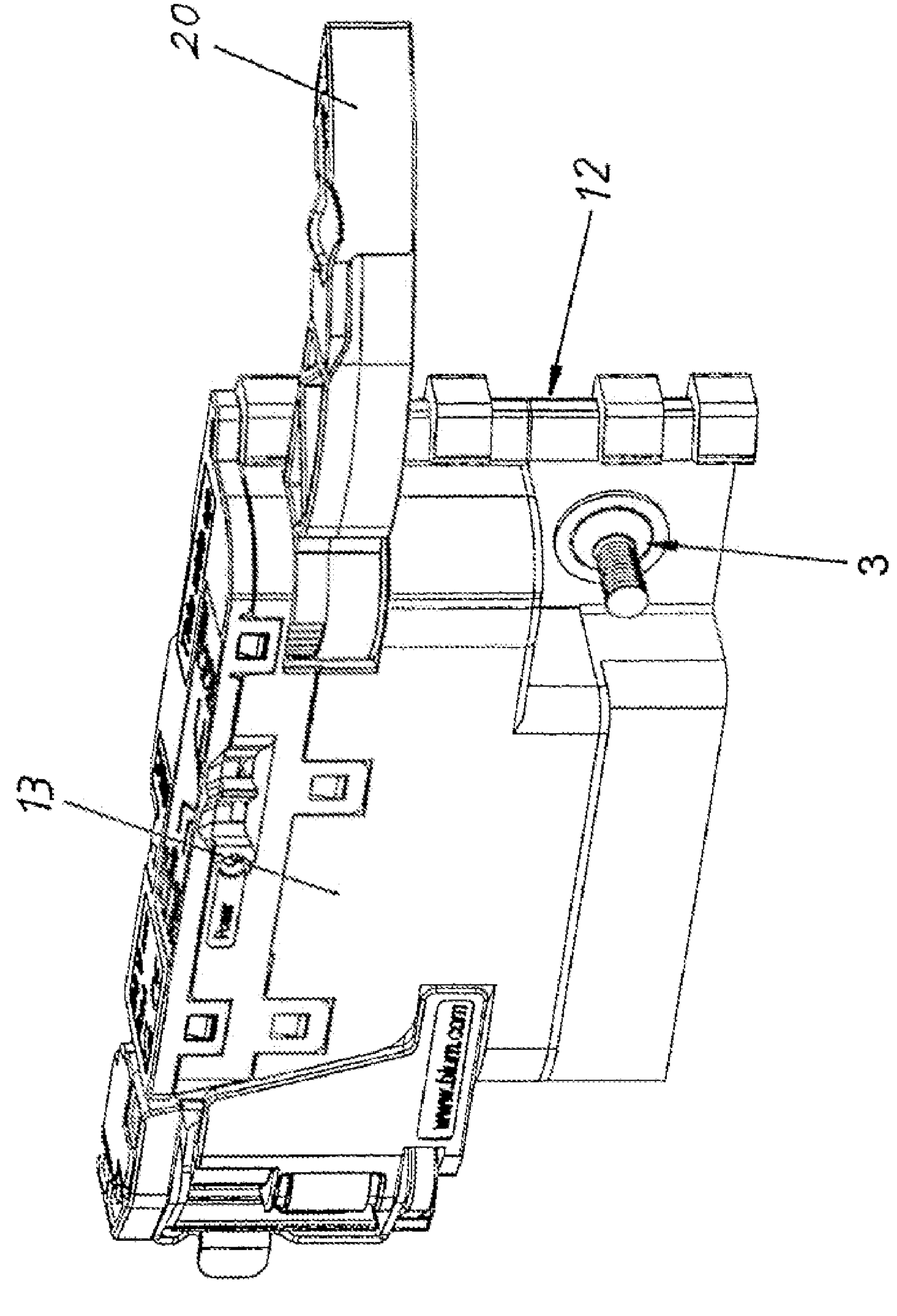
FIG. 4 shows a further view of FIG. 3 in a different operating position.
Figure 8:
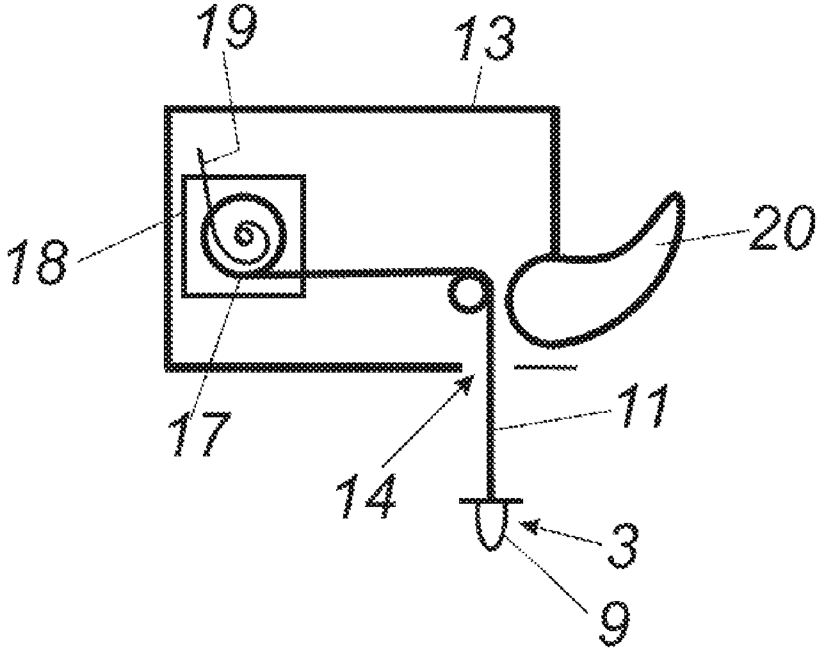
FIG. 8 is a schematic diagram of the retraction device.

FIG. 4 shows the drive 12 used in FIG. 3, wherein the pulling means 11 has a second end attached to a roller 17, and has been wound completely on to the roller 17 as shown in the schematic diagram of FIG. 8. The roller 17 and electric motor 18 are also arranged in the housing 13, as shown in the schematic diagram of FIG. 8. A second (pulling) force storage means 19 is configured to bias the roller 17 in the winding direction.

Figure 5:
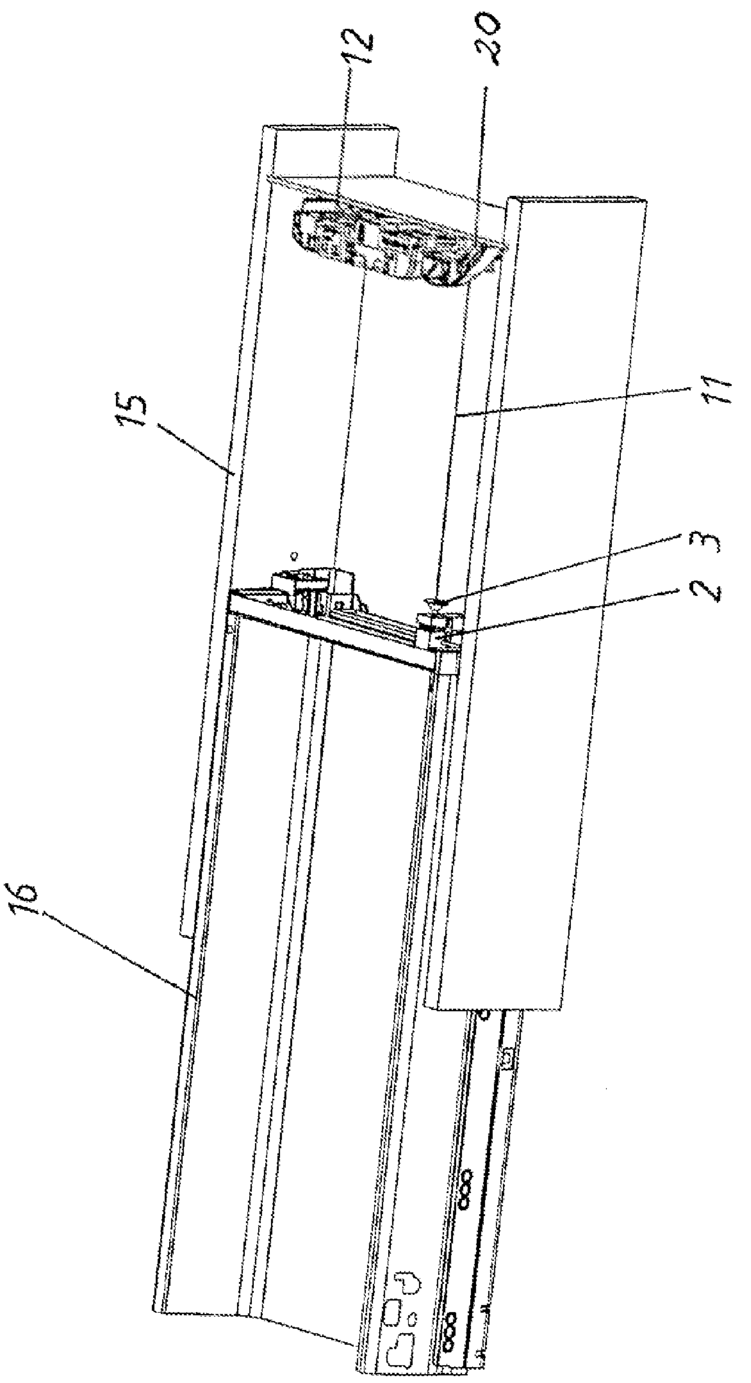
FIG. 5 shows a portion of a furniture body or carcass with a movable furniture part and a retraction device as shown in FIGS. 3 and 4.

FIG. 5 shows a portion of a furniture body or carcass 15, in which a drawer 16 as the movable furniture part is movably mounted. The first coupling portion 2 of a coupling 1 according to the invention is arranged at the rear side of the drawer 16. In the FIG. 5 condition, the second coupling portion 3 of the coupling 1 according to the invention is connected to the first coupling portion 2 so that the drawer 16 can be moved by the pulling means 11 into its closed final position into the furniture carcass 15. The ejection lever 20 serves to eject the drawer 16 from the furniture carcass 15.

Figure 6:
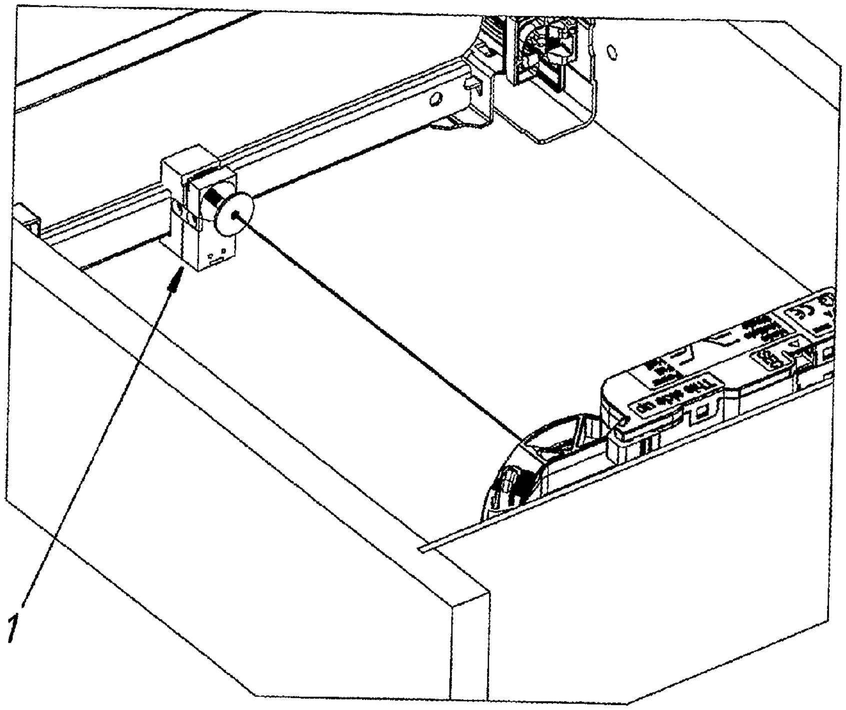
FIG. 6 shows a detail view of FIG. 5, and FIGS. 7*a* through 7*c* show various views of a retraction process.
Figure 7C:
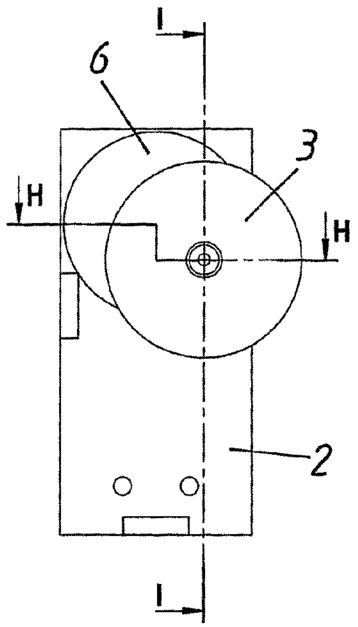
Figure 7B:
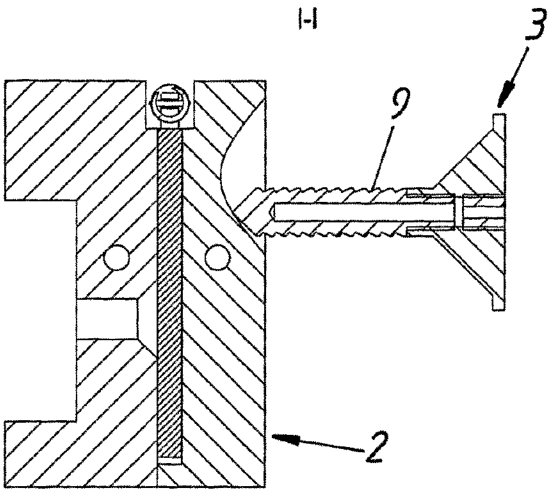
Figure 7A:
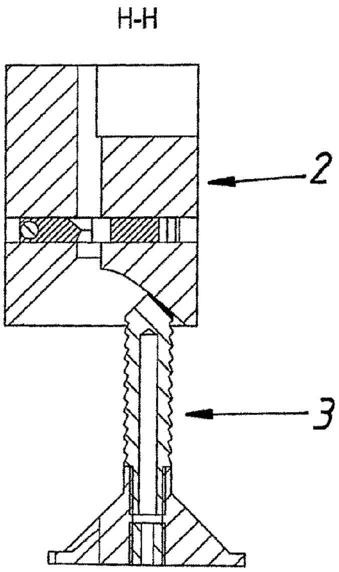

FIG. 6 shows a detail view of FIG. 5. FIGS. 7*a* through 7*c* show a situation in which the second coupling portion 3 is arranged eccentrically relative to the first coupling portion 2 due to installation tolerances. It will be seen that the funnel 6 nonetheless permits capture of the pin 9 of the second coupling portion 3.

The invention claimed is:

1. A retraction device for a movable furniture part, comprising:

a roller;

a pulling member to be wound on said roller;

an electric motor for driving said roller; and a coupling for releasably connecting the movable furniture part to said pulling member, said coupling including a first coupling portion to be fastened to the movable furniture part and a second coupling portion connected to a first end of said pulling member, said pulling member having a second end connected to and wound on said roller, said first coupling portion and said second coupling portion being discrete portions detachably connected to each other, said first coupling portion having an opening for at least partially receiving said second coupling portion, said coupling further including a locking mechanism for locking said first coupling portion to said second coupling portion in at least two different positions, said locking mechanism and said second coupling portion being configured so that said second coupling portion is adjustably fixable at different depths within said opening of said first coupling portion in said at least two different positions.

2. The retraction device of claim 1, wherein said locking mechanism is configured to release a connection between said first coupling portion and said second coupling portion upon attainment of a predetermined separation force.

3. The retraction device of claim 2, wherein said locking mechanism is configured so that the predetermined separation force is of equal magnitude for each of said at least two different positions.

4. The retraction device of claim 2, wherein said locking mechanism has two clamping jaws biased relative to each other by a locking force storage means, said clamping jaws being configured to clamp said second coupling portion in a locking condition.

5. The retraction device of claim 1, wherein said second coupling portion has a pin to be inserted into said opening of said first coupling portion.

6. The retraction device of claim 5, wherein said pin has at least two axially spaced latching positions for engaging clamping jaws of said locking mechanism.

7. The retraction device of claim 6, wherein each of said latching positions comprises one or more grooves for engaging said clamping jaws in a locking condition.

8. The retraction device of claim 7, wherein a quantity of said grooves is identical for each of said latching positions.

9. The retraction device of claim 7, wherein said pin has a plurality of adjacent grooves along an axial length thereof.

10. The retraction device of claim 5, wherein said first coupling portion further has a funnel in front of said opening for capturing said pin.

11. The retraction device of claim 1, further comprising a housing accommodating said roller and said electric motor therein.

12. The retraction device of claim 11, wherein said housing has a window substantially larger than a cross-section of said pulling member, said window being located in an unwinding region of said roller for allowing said pulling member to pass therethrough.

13. The retraction device of claim 1, further comprising a pulling force storage means for biasing said roller in a winding direction.

14. The retraction device of claim 1, wherein said locking mechanism includes a pair of clamping jaws, said clamping jaws being held together by a locking force storage means, said second coupling portion having a pin to be held between said clamping jaws by a force of said locking force storage means so as to detachably connect said second coupling portion to said first coupling portion.

* * * * *